United States Patent [19] [11] 3,914,668

Okamoto [45] Oct. 21, 1975

[54] REEL MOTOR CONTROL CIRCUIT IN A TAPE RECORDER

[75] Inventor: Hiroshi Okamoto, Kawagoe, Japan

[73] Assignee: TEAC Corporation, Musashino, Japan

[22] Filed: Feb. 28, 1974

[21] Appl. No.: 447,026

[30] Foreign Application Priority Data

Mar. 7, 1973 Japan................................ 48-26849
Aug. 14, 1973 Japan............................ 48-91077

[52] U.S. Cl................................... 318/7; 242/55.12
[51] Int. Cl.$^{2}$......................................... B65H 59/38
[58] Field of Search...................... 318/7; 242/55.12

[56] References Cited

UNITED STATES PATENTS 3,444,445 5/1969 Mullin.................................... 318/7

*Primary Examiner*—T. E. Lynch
*Attorney, Agent, or Firm*—Holman & Stern

[57] ABSTRACT

A reel motor control circuit in a tape recorder has a circuit for applying equal voltages respectively to reel motors on the tape-supply side and on the tape-takeup side at the time when the tape travel is stopped. The two reel motors thereupon generate rotational torques in mutual opposite directions to impart an appropriate tension to the tape, thereby stopping the tape travel and sustaining the resulting stopped state.

4 Claims, 3 Drawing Figures

REEL MOTOR CONTROL CIRCUIT IN A TAPE RECORDER

BACKGROUND OF THE INVENTION

The present invention relates generally to a reel motor control circuit in a tape recorder, and more particularly to a reel motor control circuit operable to vary the voltages applied to reel-drive motors respectively on the tape-supply side and the tape-takeup side in accordance with each of the control modes of a tape recorder and to apply substantially the same voltage to both of these motors particularly at the time of tape stopping.

Heretofore, there has been a tape recorder in which individual motors are provided exclusively for the tape-supply reel and the tape-takeup reel, respectively, and the voltages applied on these motors are so controlled that a torque in the direction opposite to the direction for unwinding the tape is imparted to the reel on the tape supplying or unwinding side, and an appropriate back tension is thereby applied to the tape. In a tape recorder of this type, there is provided a mechanical braking device whereby a large braking force is applied to a reel disc on which a reel is mounted when the reel disc is rotating in the direction for unwinding the tape, and a small braking force is applied to the reel disc when it is rotating in the tape takeup direction. When the tape recorder is placed in the stop mode and the tape travel is stopped, the application of voltages to the reel motors is cut off, and the above mentioned mechanical braking device operates to apply a greater braking force to the reel disc of the tape unwinding side than that applied to the reel disc on the tape-takeup side thereby to stop the tape travel without producing a slack in the tape.

This mechanical braking device employs means such as a brake band provided with brake shoes, for example, and is adapted to operate with so-called directivity in accordance with the rotational direction of a reel disc as described above to press more powerfully against (biting into) the reel disc and to relax its pressure against (backing off from) the reel disc.

In a mechanical braking device of this character used heretobefore, however, the coefficient of friction between the brake shoes and the reel disc readily varies widely depending on variable factors such as temperature, humidity, and degree of wear of the braking surface. This unstable variation in the frictional coefficient has a great influence on the automatic biting in force of the brake shoes, whereby a continually constant braking action cannot be attained.

SUMMARY OF THE INVENTION

Accordingly, it is a general object of the present invention to provide a new and useful reel motor control circuit which is not affected by the above described difficulty.

A specific object of the invention is to provide a reel motor control circuit operating at the time of tape travel stopping to apply the same voltage to both of the reel motors on the tape-supply and tape-takeup sides thereby to cause these motors to rotate in mutually opposite directions. By this provision of the invention, the tape can always be stopped smoothly with a suitable tension without excessive force being applied thereto and without slack being produced therein. In this case, a mechanical braking device may be used in conjunction with the control circuit of the invention, but this mechanical braking device need not have directivity and may be of simple construction. Furthermore, the driving power means, such as a solenoid, for actuating the braking device may be of small size.

Another object of the invention is to provide a reel motor control circuit adapted to apply the same voltage to both of the reel motors for the tape-supply and tape-takeup sides such as to cause both motors to rotate in mutually opposite directions even during the stop mode of the tape recorder. By this provision of the invention, the tape can be maintained in its stopped state without slack by applying thereto an appropriate tension by means of the two reel motors.

Still another object of the invention is to provide a reel motor control circuit capable of adjusting the voltages applied to the two reel motors thereby to equalize the rotational torques in mutually opposite directions applied to the reel discs by the motors during the above mentioned stop mode of the tape recorder.

A further object of the invention is to provide a reel motor control circuit adapted to apply relatively high voltages to the reel motors for a short time at the time of beginning of the play mode of the tape recorder. By this provision of the invention, the reel motors start rotating with a good rising characteristic of rotation at the start of the play mode.

Further objects and features of the invention will be apparent from the following detailed description with respect to a preferred embodiment of the invention when read in conjunction with the accompanying drawings.

DETAILED DESCRIPTION

Figure 1:
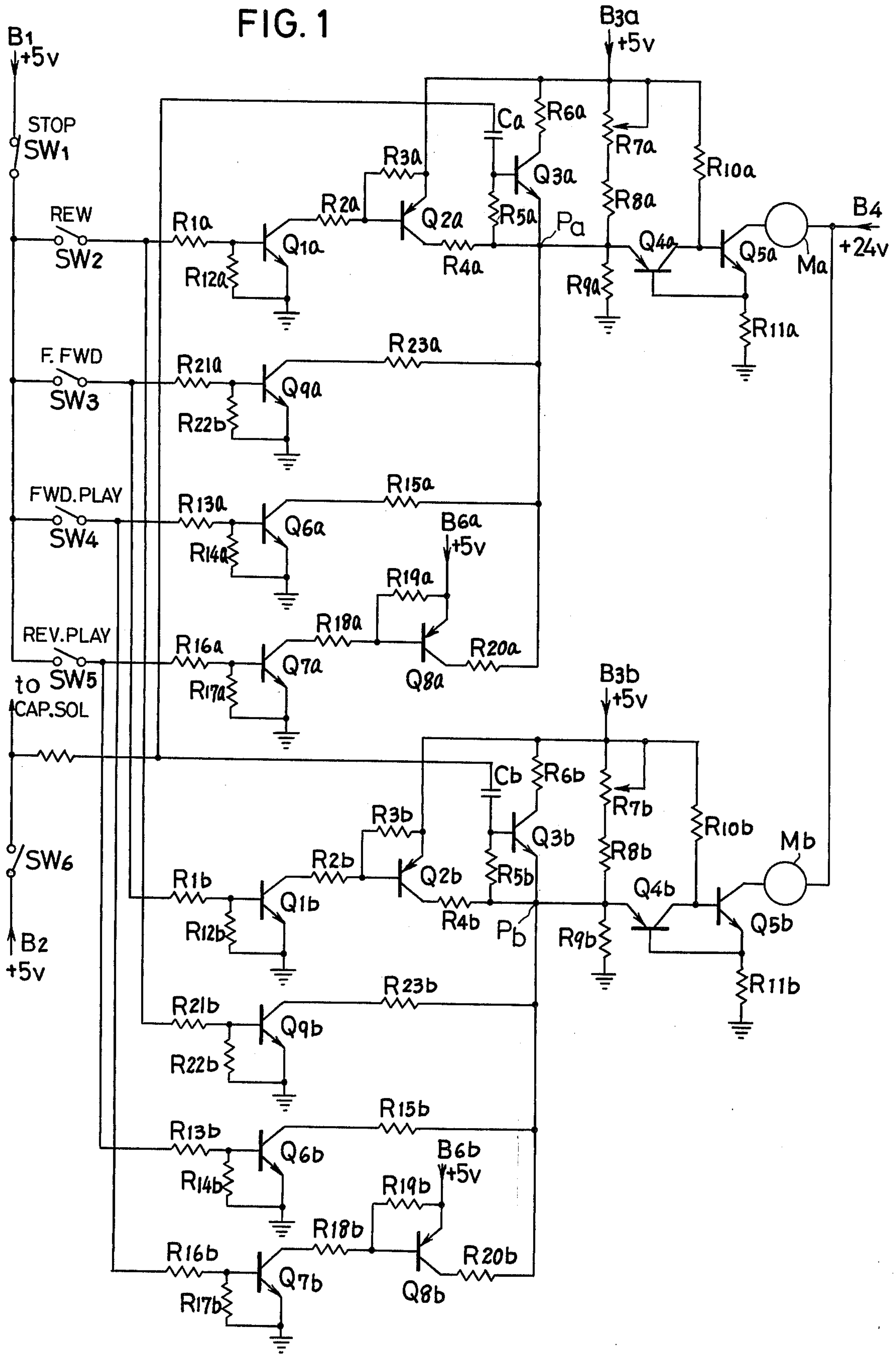
FIG. 1 is a circuit diagram of one embodiment of the reel motor control circuit according to the invention.

The circuit diagram of one embodiment of the reel motor control circuit according to the invention as applied to a tape recorder capable of forward and reverse (two-way) playing is illustrated in FIG. 1. This control circuit operates to control voltages applied to a motor Ma for driving the tape-supply reel disc and a motor Mb for driving the tape-takeup reel disc.

In the normal stop mode of the circuit indicated in FIG. 1, a normally-closed switch $SW_1$ for stopping is closed, and a normally-opened switch $SW_2$ for rewinding, switch $SW_3$ for fast forwarding, switch $SW_4$ for forward direction playing, switch $SW_5$ for reverse direction playing, and play contact point $SW_6$ are respectively open.

First, the operation at the time of play mode of the tape in forward-direction travel will be described. For this operation, the switch $SW_4$ for forward play is closed, whereupon, in mechanical interrelation with this manipulation, or as a result of the operation of a relay (not shown), the play contact point $SW_6$ is closed. As a result of the closure of the play contact point $SW_6$, voltage from a power supply $B_2$ (+ 5V) is applied by way of capacitors *Ca* and *Cb* on the bases of transistors $Q_{3a}$ and $Q_{3b}$, which thereupon become conductive for a short time $t$ until the capacitors $Ca$ and $Cb$ become charged. Consequently, during this time $t$, points $Pa$ and $Pb$ are connected by way of the transistors $Q_{3a}$ and $Q_{3b}$ and resistors $R_{6a}$ and $R_{6b}$ to power supplies $B_{3a}$ and $B_{3b}$ (+5V).

On one hand, as another result of the closure of the switch $SW_4$ for forward play, a voltage from a power supply $B_1$ (+5V) is applied by way of a resistor $R_{13a}$ on the base of a transistor $Q_{6a}$, which thereupon becomes conductive. Consequently, the point $Pa$ is grounded through a resistor $R_{15a}$ and the transistor $Q_{6a}$.

Figure 2A:
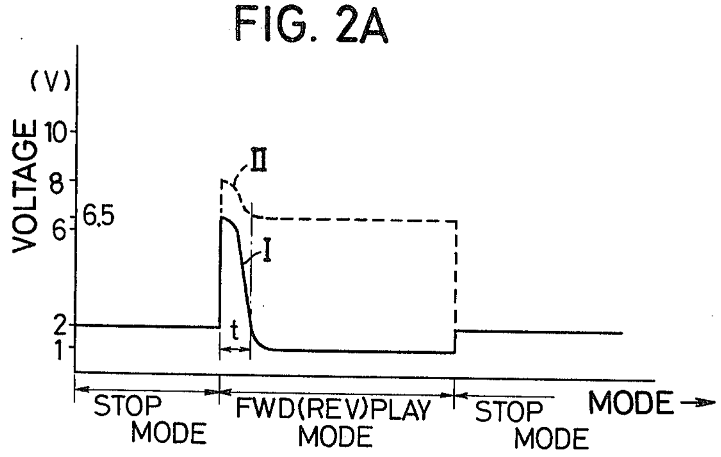
FIGS. 2A and 2B are graphical representations respectively indicating variations of voltages applied to reel motors in accordance with each operational mode of a tape recorder.

As a consequence, during the time $t$, a relatively high voltage resulting from the voltage division of the voltage of the power supply $B_{3a}$ by the combined resistance of resistors $R_{6a}$, $R_{7a}$, and $R_{8a}$ and the combined resistance of resistors $R_{9a}$ and $R_{15a}$ passes through a transistor $Q_{4a}$ for temperature compensation and is applied on the base of a transistor $Q_{5a}$. This transistor $Q_{5a}$ exhibits a resistance value corresponding to the voltage applied on the base thereof, and, in accordance with this resistance value, a voltage of a maximum value of approximately 6.5V as indicated by full-line curve I in FIG. 2A is applied from a power supply $B_4$ (+24V) to the motor $Ma$ for driving the tape-supply reel disc.

Accordingly, when the tape is driven and caused to start traveling, the motor $Ma$ imparts a relatively large back tension to the tape, whereby a slack is not produced in the tape even when the tape is started in an abrupt manner.

When the capacitor Ca becomes charged with the elapse of the above mentioned time $t$, the transistor $Q_{3a}$ becomes non-conductive. Consequently, the voltage of the point $Pa$ becomes a value resulting from the voltage division of the voltage of the power supply $B_{3a}$ by the combined resistance value of the resistors $R_{7a}$ and $R_{8a}$ and the combined resistance value of the resistors $R_{9a}$ and $R_{15a}$. As a result, a relatively low voltage is applied on the base of the transistor $Q_{5a}$, and the voltage applied to the motor $Ma$ is limited to approximately 1 V. Accordingly, the motor $Ma$ operates in a manner to impart an appropriate back tension to the tape traveling in the normal forward direction.

On the other hand, as still another result of the above mentioned closure of the switch $SW_4$ for forward play, the voltage from the power supply $B_1$ is applied by way of a resistor $R_{16b}$ on the base of a transistor $Q_{7b}$, which thereupon becomes conductive, whereupon the voltage of a power supply $B_{6b}$ (+5V) voltage divided by resistors $R_{18b}$ and $R_{19b}$ is applied to the base of a transistor $Q_{8b}$, which thereby becomes conductive. Consequently, a voltage is applied from the power supply $B_{6b}$ by way of a resistor $R_{20b}$ to the point $Pb$, whereby a relatively high voltage determined by the power supplies $B_{3b}$ (+5V) and $B_{6b}$ and resistors $R_{6b}$, $R_{7b}$, $R_{8b}$, $R_{9b}$, and $R_{20b}$ is applied to the base of a transistor $Q_{5b}$. Accordingly, a high voltage of a maximum value of approximately 8V, as indicated by the intermittent line curve II in FIG. 2A, from the power supply B 4 is applied to the takeup motor $Mb$ during the above mentioned time $t$ until the capacitor $Cb$ is charged. Therefore, the motor $Mb$ begins the tape takeup operation with high power and good rising up characteristic of rotation.

When the capacitor $Cb$ is charged with the elapse of the above mentioned time $t$, the transistor $Q_{3b}$ becomes nonconductive, whereby a voltage determined by the power supplies $B_{3b}$ and $B_{6b}$ and resistors $R_{7b}$, $R_{8b}$, $R_{9b}$, and $R_{20b}$ is applied on the base of the transistor $Q_{5b}$. Therefore, after the elapse of the time $t$, a voltage of approximately 6V is applied to the motor $Mb$, which thereupon carries out normal tape takeup operation.

With regard to the above mentioned time $t$, the capacitance values of the capacitors $Ca$ and $Cb$ are so selected that this time $t$ will be of the order of from 0.8 m.sec. to 1.4 sec.

Then, when the tape recorder in the above described forward play state is controlled at a desired instant to change to the stop mode, the stop switch $SW_1$ is temporarily opened, and the forward play switch $SW_4$ and the play contact point $SW_6$ are also opened. As a consequence, a transistor $Q_{6b}$ becomes non-conductive, and the transistors $Q_{7b}$ and $Q_{8b}$ also become non-conductive.

Consequently, a voltage determined by the power supply $B_{3a}$ and the resistors $R_{7a}$, $R_{8a}$, and $R_{9a}$ is applied on the base of the transistor $Q_{5a}$, and the voltage applied from the power supply $B_4$ to the motor Ma becomes 2V. On one hand, a voltage determined by the power supply $B_{3b}$ and the resistors $R_{7b}$, $R_{8b}$, and $R_{9b}$ is applied on the base of the transistor $Q_{5b}$, and the voltage applied from the power supply $B_4$ to the motor $Mb$ becomes 2V.

As a result, the force due to the motor $Ma$ acting on the tape in the direction to impart back tension thereto, that is, so as to take up the tape in the direction opposite to that for paying out the tape, and the force due to the motor $Mb$ acting on the tape in the forward takeup direction become equal. Therefore, the tape is subjected to two equal forces acting in mutually opposite direction due to the reel motors $Ma$ and $Mb$ and is thereby rapidly and smoothly stopped without slack being produced therein or without excessive tension force being applied thereto.

In the stop mode of the tape recorder thereafter, voltages of 2V are applied on the motors $Ma$ and $Mb$ as long as the main power supply is not cut off, and the tape remains at rest in a tensioned state with a suitable tension force. Accordingly, when the tape recorder is subsequently changed over to another operational mode, the tape starts to travel from a state with no slack whatsoever. Therefore, there is little possibility of sound falling out or missing sound due to the failure of the recorded signal in a slack tape part to be reproduced as in the case, for example, where there is a slack in the tape at the time of starting of the play mode.

The tape recorder is placed in the state for playing with the tape in reverse travel (reverse play mode) by closing the reverse-play switch $SW_5$. As a result, the play contact point $SW_6$ also closes.

This closure of the switch $SW_5$ causes the voltage of the power supply $B_1$ to be applied by way of a resistor $r_{16a}$ to the base of a transistor $Q_{7a}$. Here, the circuit comprising transistors $Q_{7a}$ and $Q_{8a}$, resistors $R_{16a}$ through $R_{20a}$, and a power supply $B_{6a}$ is of the same circuit connection and organization as the circuit comprising the above mentioned transistors $Q_{7b}$, $Q_{8b}$, resistors $R_{16b}$ through $R_{20b}$, and power supply $B_{6b}$, and, moreover, the constants of the circuit components having the same numerals in their respective subscripts of their designations are exactly the same.

As another result of the closure of the switch $SW_5$, the voltage of the power supply $B_1$ is applied by way of a resistor $R_{13b}$ to the base of the transistor $Q_{6b}$. Here, the circuit comprising the transistor $Q_{6b}$ and resistors $R_{13b}$, $R_{14b}$, and $R_{15b}$ is the same in circuit connection and organization as the circuit comprising the transistor $Q_{8a}$ and resistors $R_{13a}$, $R_{14a}$, and $R_{15a}$, and moreover, the constants of the circuit components having the same numerals in their respective subscripts of their designations are exactly the same.

Accordingly, as will be readily understandable from the above description of the forward play mode, during the time *t* from the start of the reverse play mode, a voltage of a maximum peak of 6.5 V as indicated by full-line curve I in FIG. 2A is applied to the reel motor M*b* of the tape paying outside, while a voltage of a maximum value of 8V as indicated by the intermittent-line curve II in FIG. 2A is applied to the reel motor M*a* on the tape-takeup side. As the elapse of the time *t*, the voltage applied to the reel motor M*b* becomes 1V, while the voltage applied to the reel motor M*a* becomes 6V.

Then, when the tape recorder is switched to the stop mode, a voltage of 2V is applied from the power supply $B_4$ respectively to the reel motors M*a* and M*b*, similarly as described hereinbefore, and the tape traveling in reverse direction is stopped rapidly and smoothly.

The tape recorder is placed in the fast-forward mode by closing the fast-forward switch $SW_3$. At this time, the play contact point $SW_6$ is not closed.

As a result of the closure of the switch $SW_3$, the voltage of the power supply $B_1$ is applied by way of a resistor $R_{21a}$ on the base of a transistor $Q_{9a}$, which thereupon becomes conductive. Consequently, the point Pa is grounded through a resistor $R_{23a}$ and the transistor $Q_{9a}$.

Figure 2B:
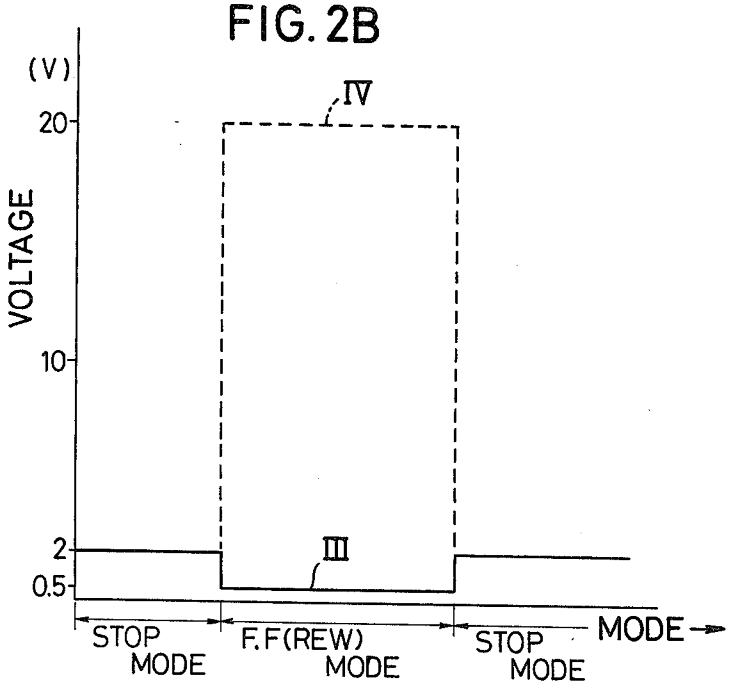

As a consequence, a relatively low voltage resulting from the voltage division of the voltage of the power supply $B_{3a}$ by the combined resistance value of the resistors $R_{7a}$ and $R_{8a}$ and the combined resistance value of the resistors $R_{23a}$ and $R_{9a}$ is applied on the base of the transistor $Q_{5a}$. Accordingly, a relatively low voltage of approximately 0.5V as indicated by full-line curve III in FIG. 2B is applied to the reel motor M*a*, which thereby applies to the tape a very small back tension of an order such that it will not interfere with the fast-forward operation and, moreover, will not produce a slack in the tape.

On one hand, as another result of the closure of the switch $SW_3$, the voltage of the power supply $B_1$ is applied by way of a resistor $R_{1b}$ to the base of a transistor $Q_{1b}$, which is thereupon rendered conductive. Consequently, the base voltage of a PNP transistor $Q_{2b}$ drops, and the transistor $Q_{2b}$ becomes conductive, whereby the voltage at the point P*b* becomes a relatively high value resulting from the voltage division of the voltage of the power supply $B_{3b}$ by the combined resistance value of resistors $R_{4b}$, $R_{7b}$, and $R_{8b}$ and the resistor $R_{9b}$. As a consequence, the internal resistance of the transistor $Q_{5b}$ decreases, and the voltage applied from the power supply $B_4$ to the reel motor M*b* becomes approximately 20V as indicated by intermittent-line curve IV in FIG. 2B. Therefore, the reel motor M*b* drives the takeup reel at high speed thereby to cause the tape to be taken up at high speed, whereby fast-forward travel of the tape is accomplished.

The tape recorder is placed in the rewind mode by closing the rewind switch $SW_2$. At this time, the play contact point $SW_6$ is not closed.

As a result of the closure of the rewind switch $SW_2$, the voltage of the power supply $B_1$ is applied by way of resistor $R_{21b}$ on the base of a transistor $Q_{9b}$. Here, the circuit comprising the transistor $Q_{9b}$ and resistors $R_{21b}$, $R_{22b}$, and $R_{23b}$ is the same in circuit organization as the circuit comprising the aforedescribed transistor $Q_{9a}$ and resistors $R_{21a}$, $R_{22a}$, and $R_{23a}$, and moreover, the circuit components of these circuits respectively of the same numeral in the subscripts of their designations respectively have the same constants.

As another result of the closure of the rewind switch $SW_2$, the voltage of the power supply $B_1$ is applied by way of a resistor $R_{1a}$ on the base of a transistor $Q_{1a}$. Here, the circuit comprising transistors $Q_{1a}$ and $Q_{2a}$ and resistor $R_{1a}$, $R_{2a}$, $R_{3a}$, $R_{4a}$, and $R_{12a}$ is the same in circuit organization as the circuit comprising the aforedescribed transistors $Q_{1b}$ and $Q_{2b}$ and resistors $R_{1b}$, $R_{2b}$, $R_{3b}$, $R_{4b}$, and $R_{12b}$, and, moreover, the circuit components of these circuits respectively of the same numeral in the subscripts of their designations respectively have the same constants.

Accordingly, as will be readily understandable from the above description of the fast-forward mode, a voltage of 0.5V as indicated by full-line curve III in FIG. 2B is applied to the reel motor M*b* on the tape unwinding side at the time of the rewind mode, while a voltage of 20V as indicated by the intermittent-line curve IV is applied to the reel motor Ma on the tape rewinding takeup side. Thus, the tape rewinding operation is carried out rapidly and smoothly.

An example of the constants of the various components of the above described circuit arrangement shown in FIG. 1 is as follows.

| Resistors: | | | | | |
|---|---|---|---|---|---|
| $R_{1a}$ , | $R_{1b}$ , | 1 KΩ | $R_{2a}$ , | $R_{2b}$ , | 330 Ω |
| $R_{3a}$ , | $R_{3b}$ , | 1 KΩ | $R_{4a}$ , | $R_{4b}$ , | 100 Ω |
| $R_{5a}$ , | $R_{5b}$ , | 10 KΩ | $R_{6a}$ , | $R_{6b}$ , | 3.3KΩ |
| $R_{7a}$ , | $R_{7b}$ , | 20 KΩ | $R_{8a}$ , | $R_{8b}$ , | 4.7KΩ |
| $R_{9a}$ , | $R_{9b}$ , | 22 KΩ | $R_{10a}$, | $R_{10b}$, | 22 KΩ |
| $R_{11a}$, | $R_{11b}$, | 6.8Ω | $R_{12a}$, | $R_{12b}$, | 22 KΩ |
| $R_{13a}$, | $R_{13b}$, | 1 KΩ | $R_{14a}$, | $R_{14b}$, | 22 KΩ |
| $R_{15a}$, | $R_{15b}$, | 5.6KΩ | $R_{16a}$, | $R_{16b}$, | 1 KΩ |
| $R_{17a}$, | $R_{17b}$, | 22 KΩ | $R_{18a}$, | $R_{18b}$, | 330 Ω |
| $R_{19a}$, | $R_{19b}$, | 1 KΩ | $R_{20a}$, | $R_{20b}$, | 1.5KΩ |
| $R_{21a}$, | $R_{21b}$, | 1 KΩ | $R_{22a}$, | $R_{22b}$, | 22 KΩ |
| $R_{23a}$, | $R_{23b}$, | 680 Ω | | | |
| Capacitors: | | | | | |
| Ca, Cb | 10 μF | | | | |

In general, the same kind of motor is used for the reel motors M*a* and M*b*. However, because of reasons such as deviations in the motor characteristics and deviations in the friction forces in the torque transmission paths from the motors to the reel discs on which the reels are mounted, the torques applied to the reels mounted on the reel discs driven by the reel motors M*a* and M*b* may not be exactly equal even when exactly the same voltage is applied to these motors M*a* and M*b*.

Accordingly, in the circuit of the above described embodiment, variable resistors are used for the resistors $R_{7a}$ and $R_{7b}$. When the tape is stopped, the resistance values of these variable resistors $R_{7a}$ and $R_{7b}$ are finely adjusted thereby to finely adjust the voltage of approximately 2V applied to motors 5*a* and 5*b* and thereby to effect adjustment for equalizing the tension forces due to these motors 5*a* and 5*b* pulling the tape in mutually opposite directions.

Furthermore, by merely applying voltages of 2V to the two reel motors M*a* and M*b* as described above when the tape travel is to be stopped, it is possible to stop the tape travel without using a mechanical braking device. However, in the case where it is desired to stop the tape travel even more quickly, a mechanical braking device may be used in conjunction with the control circuit of the invention. In this case, the only requirement for this mechanical braking device is that it merely impart a braking force in the same manner to the two reel discs. Accordingly, this braking device need not be one having directivity for imparting different braking forces in accordance with the rotational directions of the reel discs as in conventional braking devices. The reason for this is that the reel motor on the side unwinding the tape applies a rotational torque in the direction opposite to the tape unwinding direction to its reel disc, whereby a suitable back tension is applied to the tape. In this case, therefore, a mechanical braking device of very simple construction suffices.

Further, this invention is not limited to these embodiments but various variations and modifications may be made without departing from the scope and spirit of the invention.

What is claimed is:

1. A reel motor control circuit in a tape recorder having changeable operational modes including a tape travel stopping mode and a tape traveling mode including a tape playing mode and having two tape reels, said reel motor control circuit comprising: two reel motors for applying rotational torques respectively to said two reels for alternately supplying and taking up a tape depending on the operational mode; a circuit for applying a first voltage to that one of said two reel motors supplying the tape thereby to generate in said one reel motor a rotational torque in the rotational direction opposite to the tape supplying direction thereof; a circuit for applying a second voltage greater than said first voltage to that one of said two reel motors taking up the tape thereby to generate in said one reel motor a rotational torque in the tape takeup direction; and a circuit for applying third mutually equal voltages respectively to the two reel motors upon the changing of the operational mode from said tape traveling mode to said tape travel stopping mode and in the period thereafter of said tape travel stopping mode, thereby to generate in the two motors equal rotational torques acting in mutually opposite rotational directions, each of said third voltages having a value higher than said first voltage and lower than said second voltage.

2. A reel motor control circuit as claimed in claim 1 in which said circuits for applying said first, second, and third voltages to the reel motors comprise a first power source for supplying voltages to the motors to drive said motors, transistors connected in series respectively with the motors relative to said first power source, a second power source for applying voltages to the base of said transistors, said voltages of said second power source being relatively lower than the voltages of said first power source, and control circuits to control said voltages applied to the bases of said transistors such that the resistances of said transistors cause the voltages supplied to the motors to be said first, second, and third voltages.

3. A reel motor control circuit as claimed in claim 2 in which said control circuits have variable resistors respectively for finely adjusting the values of said third voltages for respective motors thereby to equalize the rotational torques in mutually opposite rotational directions acting on the reels respectively driven by the two reel motors.

4. A reel motor control circuit as claimed in claim 1 in which said circuits for applying said first and second voltages are adapted to apply respectively to said motors voltages respectively greater than said first and second voltages for specific time periods at the time of starting of said tape playing mode.

* * * * *